(12) United States Patent
Jones et al.

(10) Patent No.: US 12,493,331 B1
(45) Date of Patent: Dec. 9, 2025

(54) HIGH PERFORMANCE EMBEDDED COMPUTING INTERFACE EXTENSIBILITY MODULE

(71) Applicant: Rockwell Collins, Inc., Cedar Rapids, IA (US)

(72) Inventors: Peter W. Jones, Rockwall, TX (US); Raymond E. Knoff, Vinton, IA (US); Martin J. Jennings, Oxford, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 400 days.

(21) Appl. No.: 18/103,666

(22) Filed: Jan. 31, 2023

(51) Int. Cl.
| | | |
|---|---|---|
| *G06F 1/18* | (2006.01) | |
| *G06F 1/20* | (2006.01) | |
| *H05K 7/20* | (2006.01) | |

(52) U.S. Cl.
CPC .............. *G06F 1/183* (2013.01); *G06F 1/20* (2013.01); *H05K 7/20009* (2013.01)

(58) Field of Classification Search
CPC ........................................................ G06F 1/20
USPC ........................................................ 361/788
See application file for complete search history.

(56) References Cited

U.S. PATENT DOCUMENTS

| | | | |
|---|---|---|---|
| 6,545,850 B1* | 4/2003 | Shearman | H05K 7/1457 361/119 |
| 8,477,498 B2 | 7/2013 | Porreca et al. | |
| 2005/0069244 A1* | 3/2005 | Dajer | H04B 10/801 385/14 |
| 2020/0396861 A1 | 12/2020 | Baldwin, Jr. et al. | |
| 2022/0087045 A1* | 3/2022 | Jorge | H05K 7/1457 |

FOREIGN PATENT DOCUMENTS

WO 2022060746 A1 3/2022

* cited by examiner

Primary Examiner — Stanley Tso
(74) Attorney, Agent, or Firm — Sulter Swantz IP

(57) ABSTRACT

A convection cooled chassis providing conduction cooling to components within includes a backplane card that interfaces with an interconnect assembly, and one or more VPX backplane cards, each with a plurality of component interfaces and a backplane card interface to engage the backplane card. Static elements that are not subject to redesign are disposed on the backplane card, so they do not need to be reorganized when contacts, pins, and component interfaces are altered. Different VPX backplane cards are swappable with the backplane card. The component interfaces and backplane card interface are disposed on opposing sides of the VPX backplane card.

14 Claims, 3 Drawing Sheets

HIGH PERFORMANCE EMBEDDED COMPUTING INTERFACE EXTENSIBILITY MODULE

BACKGROUND

Existing VPX chassis may be air cooled or conduction cooled. Air cooled systems may include transition modules to quickly adapt to different cables; however such systems are not suitable for systems in an electromagnetic pulse controlled environment. On such platforms, the chassis must be sealed and therefore internal components must be conduction cooled, necessitating high performance, high temperature components.

Current convection cooled chassis/conduction cooled internal component designs tightly couple all modules and chassis circuit card assemblies (CCA) to a single backplane CCA. A single change to any contact or pin requires a significant change to the integrated chassis. Such change demands design and testing time on the order of six months to two years. The populated high density of the backplane CCA forces designers to consume high value slots for adapters, filters, and functions that could otherwise be hosted on lower cost CCA area.

It would be advantageous to have a convection cooled chassis for conduction cooled internal components capable of rapid redevelopment and minimal retesting for necessary certification.

SUMMARY

In one aspect, embodiments of the inventive concepts disclosed herein are directed to convection cooled chassis for conduction cooled internal components with a backplane card that interfaces with an interconnect assembly, and one or more VPX backplane cards, each with a plurality of component interfaces and a backplane card interface to engage the backplane card. Static elements that are not subject to redesign are disposed on the backplane card, so they do not need to be reorganized when contacts, pins, and component interfaces are altered. Different VPX backplane cards are swappable with the backplane card.

In a further aspect, the component interfaces and backplane card interface are disposed on opposing sides of the VPX backplane card.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
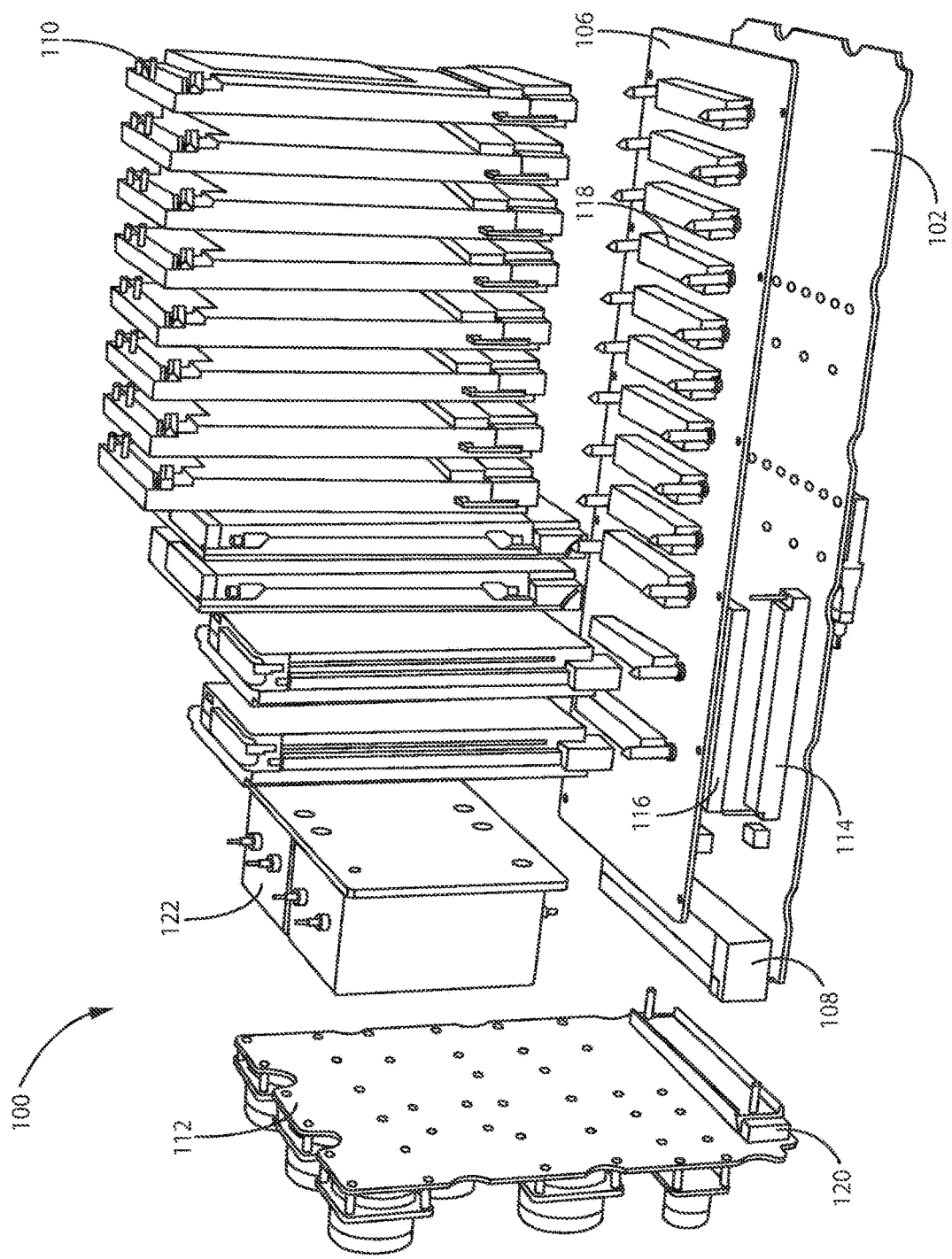
FIG. 1 shows a perspective assembly view of an apparatus according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to convection cooled chassis used to conduct heat from internal components with a backplane card that interfaces with an interconnect assembly, and one or more VPX backplane cards, each with a plurality of component interfaces and a backplane card interface to engage the backplane card. Static elements that are not subject to redesign are disposed on the backplane card, so they do not need to be reorganized when contacts, pins, and component interfaces are altered. Different VPX backplane cards are swappable with the backplane card. The component interfaces and backplane card interface are disposed on opposing sides of the VPX backplane card.

Referring to FIG. 1, a perspective assembly view of an apparatus 100 according to an exemplary embodiment is shown. The apparatus 100 (i.e., a convection cooled chassis providing conduction cooling to components within) includes a backplane card 102 (a shadow backplane card) configured to interface with one or more VPX backplane cards 106. Each of the one or more VPX backplane cards 106 is configured to interface with a plurality of components 110 (i.e., power supplies, network switches, processors, storage device, etc.).

In at least one embodiment, the backplane card 102 includes power filters 122 or interfaces for power filters, adapters, an interconnect assembly interface 108, active circuitry embodied in a field programmable gate array, and other components that are not necessary for direct interface with the plurality of components 110. The backplane card 102 provides data communication between an interconnect assembly 112 and the plurality of components 110 via the interconnect assembly interface 108 and the one or more VPX backplane cards 106.

Where the apparatus incudes a backplane card 102 and a separate VPX backplane card 106, the backplane card 102 includes a VPX backplane card interface 114 disposed to engage a backplane card interface 116 on the VPX backplane card 106. The VPX backplane card further includes a plurality of component interfaces 118 disposed to engage each of the plurality of components 110. The VPX backplane card interface 114, backplane card interface 116, and plurality of component interfaces 118 define a BUS (a system of data pathways between components 110, active circuitry, and the interconnect assembly 112).

In at least one embodiment, the backplane card 102 includes an interconnect assembly interface 108 disposed to engage a backplane interface 120 on the interconnect assembly 112. In at least one embodiment, the interconnect assembly interface 108 may be configured and disposed similar to existing VPX backplane cards to enable legacy interoperability.

In at least embodiment, the backplane card interface 116 and plurality of component interfaces 118 are disposed on opposing sides of the VPX backplane card 106. The backplane card 102 is thereby disposed beneath the VPX backplane card 106, and the overall physical architecture of the apparatus generally conforms to existing VPX devices in size and shape.

The VPX backplane card 106 comprises a high-density module of component interfaces 118. Combining the VPX backplane card 106 with a backplane card 102 decouples the high-density component interfaces 118 from the external connector. A significant amount of available space on the backplane card 102 permits integration of latent adaptable features enabling low-cost change proposals that transition from old to new platform interfaces with either programmable configuration changes or passive CCA exchanges.

Figure 2:
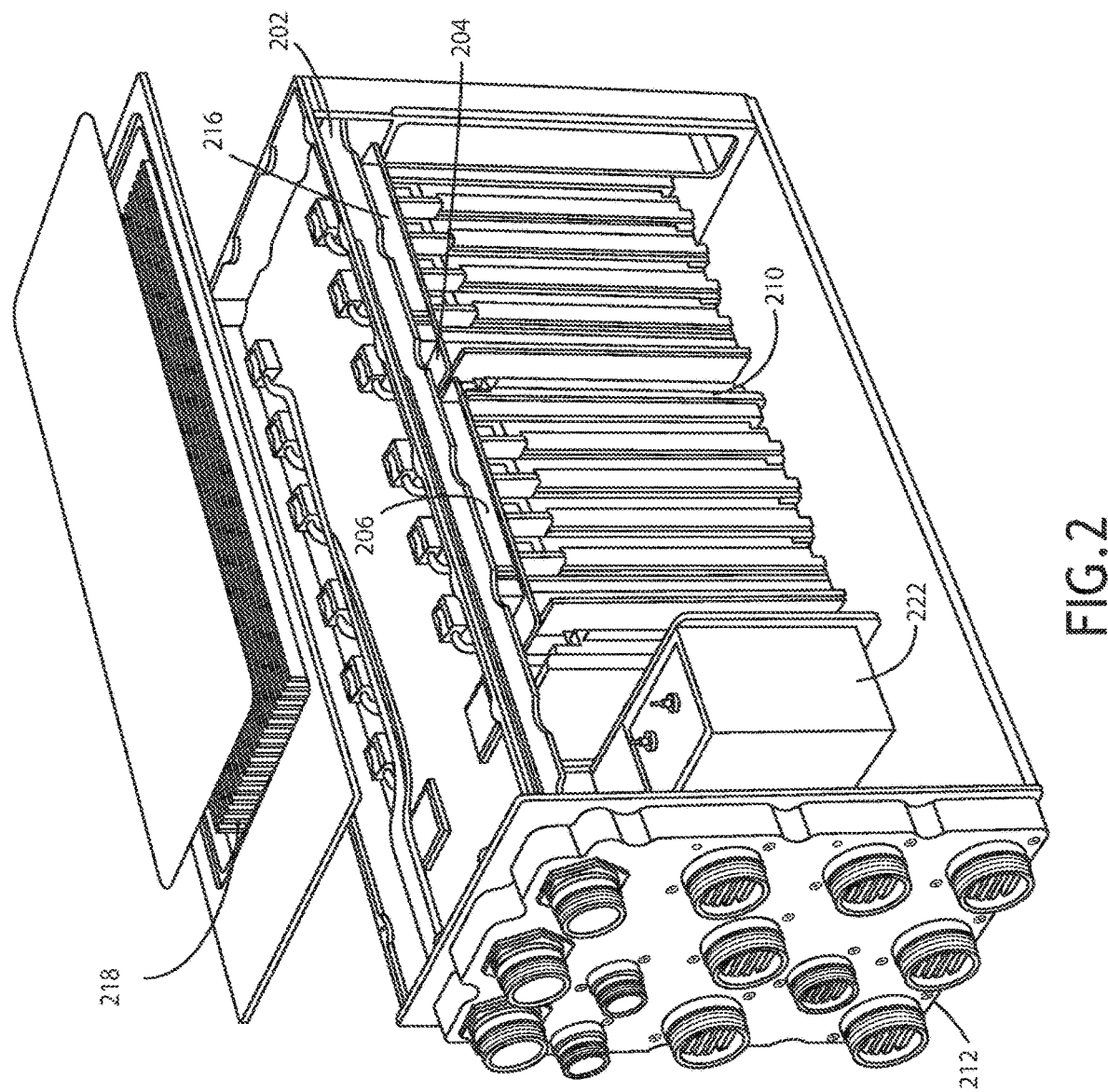
FIG. 2 shows a perspective assembly view of an apparatus according to an exemplary embodiment.
Figure 3:
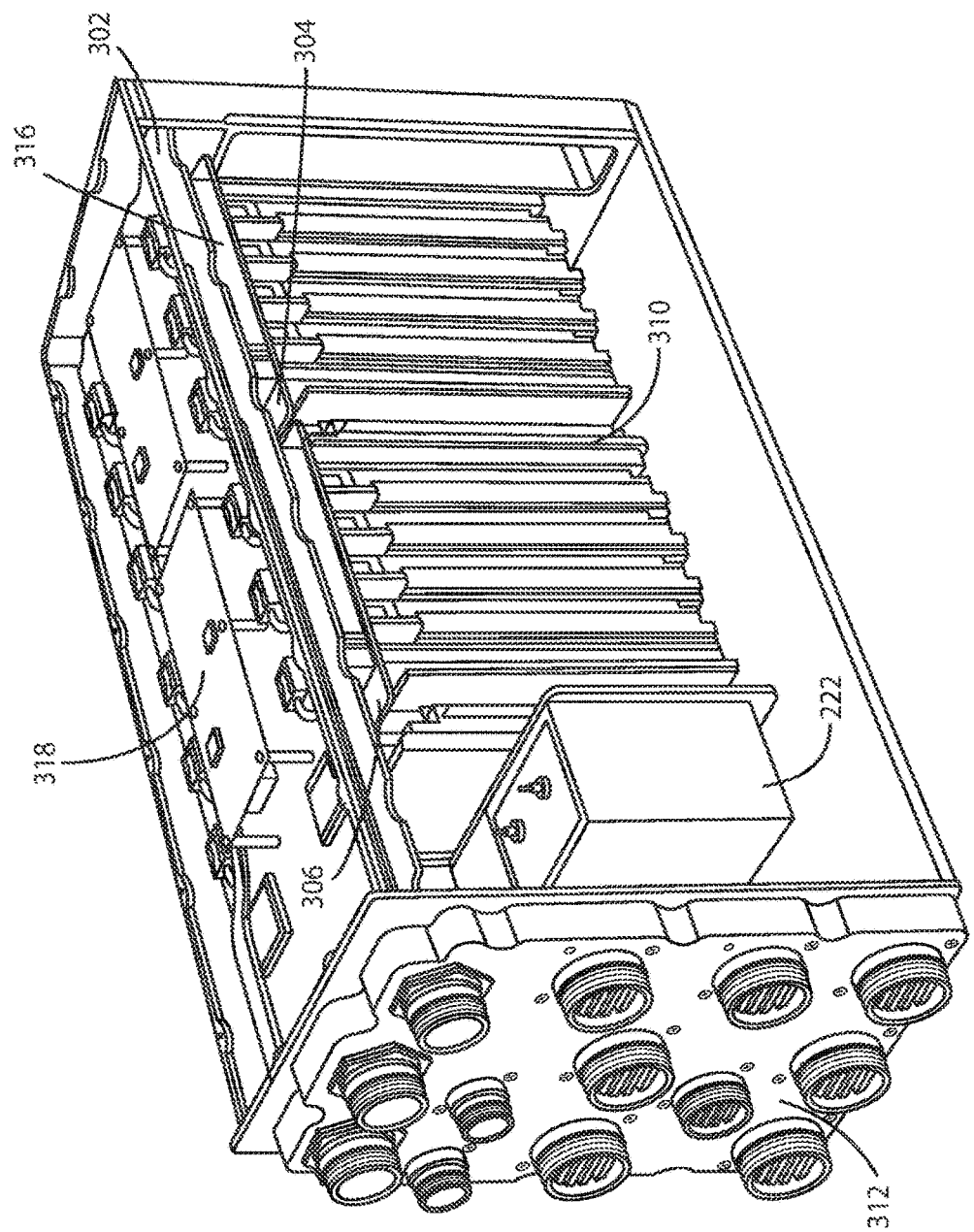
FIG. 3 shows a perspective assembly view of an apparatus according to an exemplary embodiment.

Referring to FIGS. 2 and 3, perspective assembly views of apparatuses according to exemplary embodiments are shown. Each assembled apparatus includes a backplane card 202, 302 having an interface 216, 316 with one or more VPX backplane cards 204, 304. The backplane 202, 302 includes elements that are generally unaffected when VPX component interfaces are redesigned or modified, but which in such redesign would have to be repositioned, and which would consume space better utilized for VPX components 210, 310. Such elements may include power supplies, filters, adapters, and the like.

The assembled apparatus includes an interconnect assembly 212, 312 connected to an interface on the backplane card 202, 302. Such interface may be disposed on the backplane card 202, 302 at a location corresponding to such interface on existing VPX backplane card to facilitate interoperability with existing interconnect assemblies 212, 312.

In at least one embodiment, the backplane card 202, 302 comprises a VPX backplane card interface disposed on a superior surface while each of the one or more VPX backplane cards 204, 304 comprises a backplane interface disposed on an inferior surface. The Backplane card 202, 302 and VPX backplane card 204, 304 may be engaged at the interface 216, 316 with the VPX backplane card 204, 304 directly above the backplane card 202, 302 to preserve the existing spatial relationship between the interconnect assembly 212, 312 and the VPX components 210, 310, and preserve the existing size and shape of the assembled apparatus.

In at least one embodiment, the chassis may include heat conducting features 218 such as fins or some other heat sink adaptation thermally coupled to the backplane card 202. Such heat conducting features 218 provide increased surface area for air flow to cool the internal components 210, 310.

Further, the backplane card 302 thermally couples with the chassis bottom permitting it to host active circuitry 318 that provides internal chassis functionality, external interface adaptation, filtering, switching, and the like. Such active circuitry 318 may be embodied in a field programmable gate array. The adapter and variability isolation design patterns employ standardization at connector interfaces among CCAs and permits both sets of primary interfaces CCA (external connector and module) to function as passive adapters. Passive adapter modification offers a low-cost, one to six month re-spin and retest (or even no retest) for the chassis instead of six to twenty-four months. Configurable latent interface adapters hosted on the backplane card 202, 302 permit a one hour to one month programmable-only benefit.

Embodiments of the present disclosure apply to air cooled and conduction cooled components and are analogous to a contiguous rear transition module (RTM) across the entire bottom side of the chassis. Traditionally, RTMs are coupled directly to individual module slots, but the present disclosure permits RTMs to be used in conduction cooled configurations. A single CCA may function as an RTM at a lower cost as compared to individual RTMs per module (from four to twelve CCAs). Furthermore, the backplane offers a significant amount of low-cost space to host interface adapter devices, active circuitry, and other desired components that would otherwise consume the more expensive module slots.

Embodiments of the present disclosure greatly improve adaptability of chassis to changes in external interfaces and permit the module interfaces to vary independently from the external interfaces. Embodiments shorten the development and qualification time for subsequent platform integration initiatives by inclusion of future interface components. For example, if a legacy platform has copper Ethernet interfaces at the initial design time, an embodiment that includes both copper and fiber interfaces with the ability to reconfigure the output to fiber at a later date would facilitate a platform upgrade at the chassis interface from copper to fiber in days or weeks instead of months.

Embodiments of the present disclosure enable conduction cooled components with rear transition modules decoupled from the front panel connector. Front panel connectors are platform specific, therefore decoupling allows for more universal components.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
a first backplane card; and
a second backplane card,
wherein:
the first backplane card comprises a VPX backplane card having a plurality of component interfaces on a superior surface and a backplane interface on an inferior surface;
the second backplane card comprises a first interface configured to engage an interconnect assembly at a location corresponding to a VPX backplane interface location to facilitate legacy interoperability; a second interface on a superior surface configured to engage the inferior surface of first backplane card; and active circuitry comprising a field-programmable gate array (FPGA) configured to adapt an external interface of the interconnect assembly to a module-side interface with programmable reconfiguration of the external interface; and
the second backplane card is disposed beneath the first backplane card and is thermally coupled to a chassis bottom having heat-conducting features thermally coupled to the second backplane card.

2. The computer apparatus of claim 1, wherein the active circuitry is disposed on an inferior surface of the second backplane card and the second interface is disposed on a superior surface of the second backplane card.

3. The computer apparatus of claim 1, wherein the active circuitry comprises a power filter.

4. The computer apparatus of claim 1, further comprising a third backplane card comprising a VPX backplane card, wherein the second backplane card further comprises a third interface configured to engage the third backplane card.

5. The computer apparatus of claim 1, wherein the second backplane card is disposed beneath the first backplane card.

6. A backplane card comprising:
a first interface configured to engage an interface assembly at a location corresponding to a VPX backplane interface location to facilitate legacy interoperability; and
a second interface configured to engage a backplane interface on an inferior surface of a VPX backplane card, the second interface being on a superior surface of the backplane card; and
active circuitry comprising a field-programmable gate array (FPGA) configured to adapt an external interface of the interconnect assembly to a module-side interface with programmable reconfiguration of the external interface, the backplane card being disposed to be thermally coupled to a chassis bottom when installed.

7. The backplane card of claim 6, wherein the active circuitry element is disposed on an inferior surface of the backplane card and the second interface is disposed on a superior surface of the backplane card.

8. The backplane card of claim 6, wherein the active circuitry comprises a power filter.

9. The backplane card of claim 6, further comprising one or more connection adapters.

10. A VPX system comprising:
a first backplane card; and
a second backplane card,
wherein:
the first backplane card comprises a VPX backplane card having a plurality of component interfaces on a superior surface and a backplane interface on an inferior surface; and
the second backplane card comprises a first interface configured to engage an interconnect assembly at a location corresponding to a VPX backplane interface location to facilitate legacy interoperability; a second interface on a superior surface configured to engage the first backplane card; and active circuitry comprising a field-programmable gate array (FPGA) configured to adapt an external interface of the interconnect assembly to a module-side interface with programmable reconfiguration of the external interface; and
the second backplane card is disposed beneath the first backplane card and is thermally coupled to a chassis bottom including heat-conducting features thermally coupled to the second backplane card.

11. The VPX system of claim 10, wherein the active circuitry is disposed on an inferior surface of the second backplane card and the second interface is disposed on a superior surface of the second backplane card.

12. The VPX system of claim 10, wherein the active circuitry comprises a power filter.

13. The VPX system of claim 10, further comprising a third backplane card comprising a VPX backplane card, wherein the second backplane card further comprises a third interface configured to engage the third backplane card.

14. The VPX system of claim 10, wherein the second backplane card is disposed beneath the first backplane card.

* * * * *